United States Patent [19]
Peters

[11] 3,817,282
[45] June 18, 1974

[54] IN-LINE TEST VALVE
[76] Inventor: Clifford M. Peters, P.O. Box 975, Kilgore, Tex. 25662
[22] Filed: Sept. 14, 1972
[21] Appl. No.: 288,955

[52] U.S. Cl.............. 137/607, 73/4 R, 251/149.6
[51] Int. Cl............................................ G01l 27/00
[58] Field of Search.................. 137/239, 240, 607; 251/149.6, 149.7; 73/4 R

[56] References Cited
UNITED STATES PATENTS

| | | | |
|---|---|---|---|
| 2,548,957 | 4/1951 | Di Rosa | 137/239 |
| 2,958,219 | 11/1960 | McIntyre et al. | 73/4 R |
| 3,036,595 | 5/1962 | Rogers | 251/149.6 X |
| 3,049,148 | 8/1962 | Richardson | 73/4 R X |
| 3,280,834 | 10/1966 | Zahuranec | 251/149.6 X |

Primary Examiner—Robert G. Nilson

[57] ABSTRACT

A test valve is positioned between a first fluid pressure source acting on valve means to be tested and includes first fluid passage means to normally communicate the first fluid pressure source with the valve means to be tested, and also includes alternate passage means which is normally closed off by the check valve means so that when flow through the first fluid passage means is closed, the first fluid pressure source can be shut off from acting on the valve means to be tested and the alternate passage means then communicated with a test pressure source and the first passage means to flow test fluid from the exterior of the test valve to the valve means to be tested to test the functioning of the valve means. When the testing has been accomplished, the test valve is constructed and arranged so that it will automatically close off the alternate passage means and re-establish communication with the first fluid pressure source normally acting on the valve means whereby the tested valve means returns to normal operation in relation to the first fluid pressure source.

3 Claims, 4 Drawing Figures

PATENTED JUN 18 1974    3,817,282

IN-LINE TEST VALVE

CROSS-REFERENCE TO RELATED APPLICATIONS

The present invention relates to a test valve arrangement for devices such as illustrated by my invention described and claimed in my co-pending applications, Ser. Nos. 178,138 filed Sept. 7, 1971 for "High or Low Pressure Cutoff Control Valve" and 178,062 filed Sept. 7, 1971 for "Combination High and Low Pressure Cutoff Control Valve" now U.S. Pat. Nos. 3,746,047 and 3,716,074 respectively.

SUMMARY OF THE INVENTION

The use of pilot valves for automatically shutting off a fluid pressure source when the fluid in the pressure source exceeds a predetermined maximum or falls below a predetermined minimum is well known in the art illustrated in U.S. Pat. No. 3,043,331. Heretofore, in order to test such safety valve arrangement, a manual valve was employed between the pilot valves and the fluid pressure source acting thereon so that the fluid pressure source acting on the test valve could be cut off and an alternate fluid pressure medium then connected to test the operation of the valves.

Heretofore, it has not been uncommon for such manually operated valves to be left in off position, thus rendering the pilot safety valves inoperative for the purposes intended.

The present inventon provides an in-line test valve which is normally open to a first fluid pressure source acting on pilot valve means, but which test valve means can be actuated to close off communication between the first fluid pressure source and the test valve means and for then automatically communicating the pilot safety valves with an alternate fluid pressure source for testing thereof. After the test has been completed, the test valve is constructed and arranged so that when communication with the fluid test medium is shut off it will automatically open to re-establish communication with the first fluid pressure source that normally acts on the pilot safety valves and with which the pilot safety valves are intended to respond when such fluid pressure source exceeds a predetermined maximum or falls below a predetermined minimum.

Still another object of the present invention is to provide an in-line test valve which assures that after each test of valve means, the test valve will be automatically opened so as to assure that the valve means being tested is always in an operative condition.

Yet a further object of the present invention is to provide an in-line test valve which remains in position and normally communicates a first fluid pressure source with the valve means to be tested, but which test valve is constructed and arranged so that communication between the first fluid pressure source and the valve means to be tested can be cut off and to thereafter enable an alternate fluid pressure source externally of the test valve to be conducted to the valve means to be tested for testing thereof and thereafter closing off communication between the alternate fluid pressure source and the valves being tested, such test valve being constructed and arranged so that when such event occurs, it will automatically re-establish communication between the first fluid pressure source to which the valve means tested is responsive for functioning thereof.

Other objects and advantages of the present invention will become more apparent from a consideration of the following description and drawings.

DESCRIPTION OF THE PREFERRED EMBODIMENT

Figure 1:
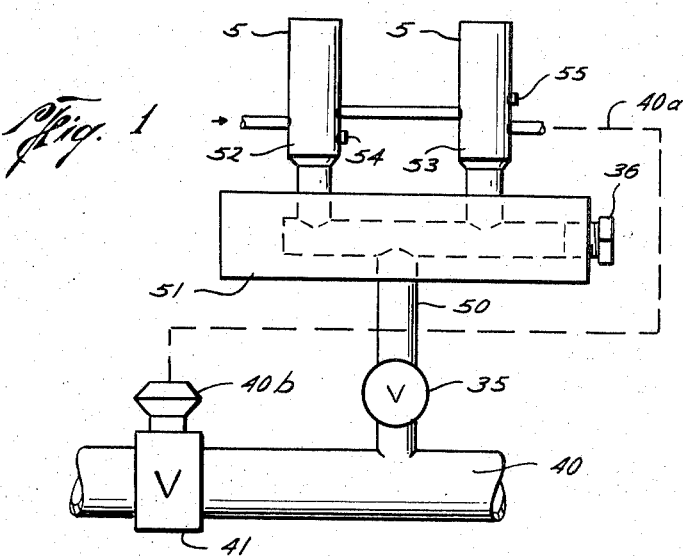
FIG. 1 is a schematic drawing illustrating one arrangement in which the present invention may be employed.

Attention is first directed to FIG. 1 of the drawings wherein the present invention is illustrated as employed in an arrangement where valve means 5 is employed as a high pressure and low pressure safety cutoff that functions in relation to a first fluid pressure source such as is represented by conduit 40. A conduit 50 is provided for communicating the first fluid pressure source 40 with the valve means 5 through the manifold 51 communicated with each valve means 5. More specifically, the manifold 51 communicates with the low pressure control valve 52 in a manner well known in the art and also with the high pressure control valve 53 in a manner well known in the art, as shown in my co-pending applications and in the patent hereinbefore referred to. A plug 54 closes off one of the outlets of the low pressure valve 52 and high pressure valve 53 has a plug 55 closing off one of the outlets therein.

The fluid from fluid pressure source 40 normally maintains valves 52 and 53 in open position for passage of fluid through the conduit 40, but when the pressure in conduit 50 exceeds a predetermined maximum or falls below a predetermined minimum, such occurrence acts to shut off flow of pressure fluid through the pilot valve 52 and 53, all as well known in the art. When the flow of pressure fluid in conduit 40 exceeds a predetermined maximum or falls below a predetermined minimum so as to actuate either of the safety valves 52 and 53, this in turn cuts off the source of fluid pressure acting through the conduit schematically illustrated at 40a which normally maintains the valve means indicated at 41 in conduit 40 in open position. When the source of fluid pressure acting on the valve operator 40b through conduit 40a is cut off, spring means associated with such structure in a manner well known in the art urges the valve 41 to closed position. This general function is well understood by those skilled in the art.

Heretofore, in the testing of the valve means 52 and 53 it has been customary to provide a manually operable valve in the conduit 50 as represented at 35. Such valve means 35 after being closed to shut off communication between the valve means 52 and 53 to be tested and the first fluid pressure source 40, enables the plug 36 to be removed from manifold 51 so that a test of the pilot valves 52 and 53 could be conducted from an alternate pressure source to determine whether or not they were functioning properly.

It has not been uncommon in such prior art arrangements for the manually operable valve 35 to be left in closed position. When this occurs, communication between the first fluid pressure source 40 and the valves 52 and 53 is shut off, thus rendering the safety pilot valves 52 and 53 inoperative for the function intended.

Figure 2:
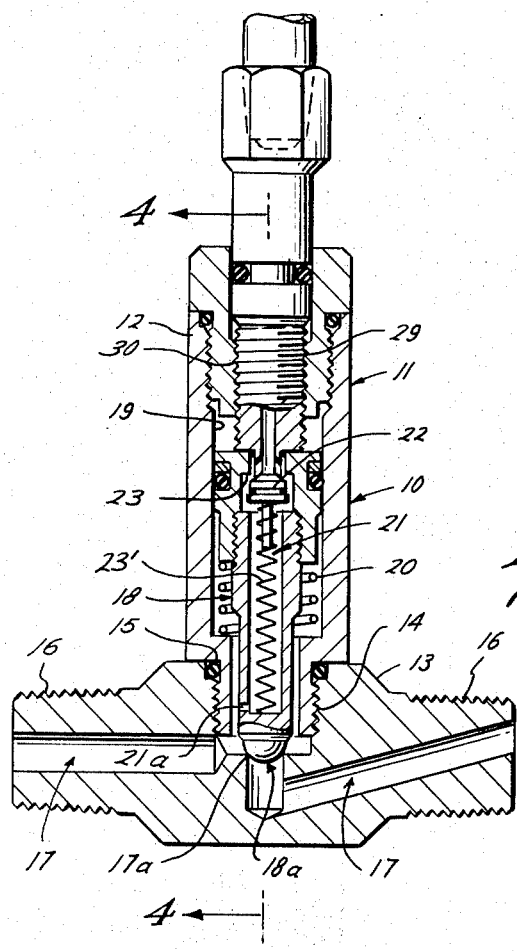
FIG. 2 is an enlarged sectional view illustrating one embodiment of the invention.

In order to overcome this, the valve referred to generally by the numeral 10 in FIG. 2 of the present invention is employed in conduit 50 in lieu of the valve 35 and is positioned in conduit 50 between the valve means 52 and 53 and the source of fluid pressure 40 at any suitable location in the conduit 50, such as the position where the valve 35 heretofore had been normally employed.

The test valve means 10 includes a body referred to generally at 11 comprising the bonnet 12 which may be secured with the lateral extension 13 of such body by any suitable means such as the threads 14 with suitable seal means 15 therebetween to inhibit leakage of fluid.

The body means 11 includes any suitable means such as threads or flanges, and as illustrated threads 16, to enable the body 11 to be connected in the conduit 50 between the first fluid pressure source 40 and the valve means 52 and 53 to be tested.

The lateral extension 13 of the valve body 11 includes first passage means referred to generally by the numeral 17 for normally communicating the first fluid pressure source 40 with the valves 52 and 53 to be tested.

The body means 11 includes plunger means 18 slidably and sealably mounted in the bore 19 of the bonnet 12, which plunger means is provided with seat means 18a for seating on the seat 17a formed on the first passage means 17 intermediate its ends, and when the plunger means 18 is thus seated, communication between the first fluid pressure source 40 and the valve means 52 and 53 to be tested is shut off, as shown in FIG. 2.

Suitable means such as spring means 20 is carried in the bore 19 of the bonnet 12 that tends to urge the plunger 18 to a position in the bonnet 12 of the body 11 to normally maintain communication between the first fluid pressure source 40 and the valve means 52 and 53 to be tested so that the valve means 52, 53 is always responsive to function as a high and low safety shut off.

Additional passage means are associated with the body 11 for communicating the first passage means 17 in body 11 to the exterior of the body when the plunger 18 closes off communication through the past passage means 17 and between the first fluid pressure source 40 and the valve means 52, 53 to be tested. Such additional passage means as illustrated is shown at 21 as extending through the plunger 18 with one end 21a thereof communicating with the first passage means 17 downstream of the seat 17a relative to the first fluid pressure source. The additional passage means 21 is normally closed off by means of the check valve 22 and spring means 23' that normally urges the check valve means 22 against seat 23 formed between the ends of the additional passage means 21.

Figure 4:
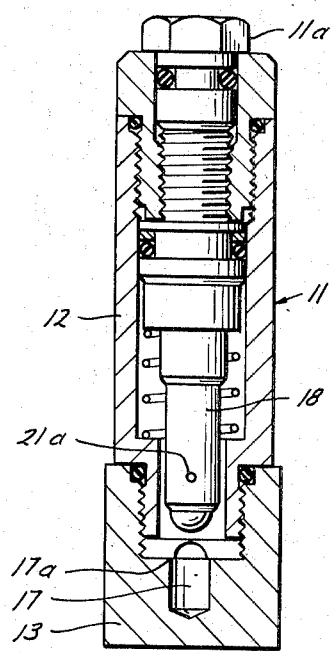
FIG. 4 is a sectional view, partly in elevation on the line 4—4 of FIG. 2, but illustrating the position of the test valve when it is in open position.

Thus, when the valve means 10 is positioned in the conduit 50 and is in non-test position, it will be in the position illustrated in FIG. 4, in which condition the plunger 18 is shown as being retracted relative to the seat 17a in the first passage means 17 and also in such situation the spring means 23' will have urged the check valve means 22 against the seat 23 so that communication between the additional passage means 21 and the exterior of the valve body 11 is closed off.

Figure 3:
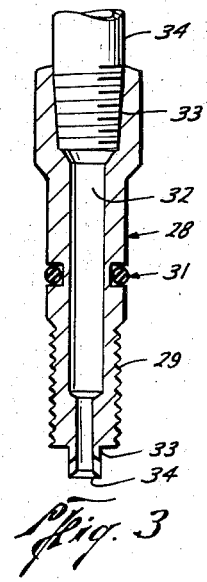
FIG. 3 is a sectional view partly in elevation illustrating a stinger means of the present invention which functions to automatically close off communication of the test valve with the first fluid pressure source and establish communication with an alternate fluid pressure source externally of the test valve for testing of the valve means.

In FIG. 3 a hollow stinger means referred to generally by the numeral 28 is provided to engage with the valve body means 11 to move and hold the plunger 18 in the position illustrated in FIG. 2 of the drawings. Such hollow stinger means 28 includes suitable means such as a threaded portion 29 for engaging with cooperating surface means 30 in the valve body 11 to hold the hollow stinger 28 in position after it has been engaged within the valve body 11. Additionally, suitable seal means as illustrated at 31 are provided for sealing off between the hollow stinger 28 and the valve body 11 when the hollow stinger 28 is seated therein.

The hollow stinger 28 includes passage means 32 therein and a projection 33 whose end 34 is adapted to engage the check valve 22 and move it off the seat 23 when the hollow plunger 28 is inserted in its final position in valve body 11.

Thus, when the hollow stinger 28 is engaged with the valve body, it moves and holds the plunger 18 in position to close off the first passage means by urging the plunger 18 so that its seat 18a engages the seat 17a of the first fluid passage means and closes off communication between the first fluid pressure source 40 and the valve means 52, 53 to be tested. At the same time, the stinger means 28 by reason of the extension 34 engages and moves the check valve means 34 off the seat 23 to open the additional passage means 21 so that the first passage means 17 downstream of the seat 17a may communicate through the end 21a of the passage means 21 and through the bore 32 of the stinger 28 to the exterior of the valve body 11. The hollow stinger 28 is provided with a suitable configuration represented generally by the numeral 33 for connecting with an alternate fluid pressure source by means of the conduit illustrated at 34 whereby fluid pressure from such alternate fluid pressure source may be conducted through the hollow stinger 28, the valve body 11 and to the valve means 52, 53 to be tested.

After the test has been conducted to determine that the low pressure safety pilot valve 52 and high pressure safety pilot valve 53 are operating properly, the hollow stinger 28 may be disengaged from the valve body 11, whereupon the components thereof return to the position illustrated in FIG. 4. If desired, a suitable plug such as is illustrated at 11a may be threaded into the end of the valve body 11 to close it off.

The foregoing arrangement provides a test valve which may be permanently left in the conduit 50 between the first fluid pressure source 40 and valve means such as illustrated at 52, 53 to be tested. However, such arrangement enables fluid pressure from an alternate source to be communicated to the valves 52, 53 for tests thereof while shutting off flow from the first fluid pressure 40 source during such tests. When the test is completed, removal of the hollow stinger 28 and disconnecting the test valves from such alternate fluid pressure source automatically returns the valves to normal operating position to assure that the safety test valves will always be in proper functioning relationship to the fluid pressure source 40.

The foregoing disclosure and description of the invention are illustrative and explanatory thereof, and various changes in the size, shape, and materials as well as in the details of the illustrated construction may be made without departing from the spirit of the invention.

What is claimed is:

1. An arrangement for closing off a first fluid pressure source acting on valve means and communicating an alternate fluid pressure source to act on the valve means for testing the valve means comprising:
   a. test valve means for positioning between the first fluid pressure source and the valve means to be tested, said test valve means comprising:
      1. body means including means thereon for securing said test valve means between the first fluid pressure source and the valve means to be tested;
      2. said body having first passage means therein communicating the first fluid pressure source with the valve means to be tested;
      3. plunger means in said body movable to close off communication between the first fluid pressure source and the valve means to be tested;
      4. means acting on said plunger means to urge it to a position in said body to normally maintain communication between the first fluid pressure source and the valve means to be tested;
      5. surface means on said plunger means engagable to move and hold said plunger in position to close off communication between the first fluid pressure source and the valve means to be tested;
      6. there being additional passage means associated with said body for communicating the first passage means in said body to the exterior thereof when said plunger closes off communication between the first fluid pressure source and the valve means to be tested;
      7. spring loaded check valve means normally closing off the additional passage means and movable upon engagement to communicate the first passage means to the exterior of said body; and
      8. said body having an opening therein for access to engage said plunger surface means and said check valve means.

2. The invention of claim 1 including:
   a. hollow stinger means engageable in the opening in said body to move and hold said plunger in position to close off the first passage means to prevent communication between the first fluid pressure source and the valve means to be tested;
   b. said stinger means including means for engaging and moving said check valve means to open the additional passage means whereby the first passage means communicates to the exterior of said body; and
   c. said hollow stinger means including means for connecting with an alternate fluid pressure source whereby fluid pressure may be conducted to test the valve means.

3. The invention of claim 1 wherein:
   a. the first passage means includes seat means intermediate the ends of the first passage means;
   b. seat means on said plunger means for seating in said seat means of said first passage means; and
   c. the additional passage means having one end thereof communicating with the first passage means downstream of said seat means relative to the first fluid pressure source when said seat means are engaged.

* * * * *